Figure 1:
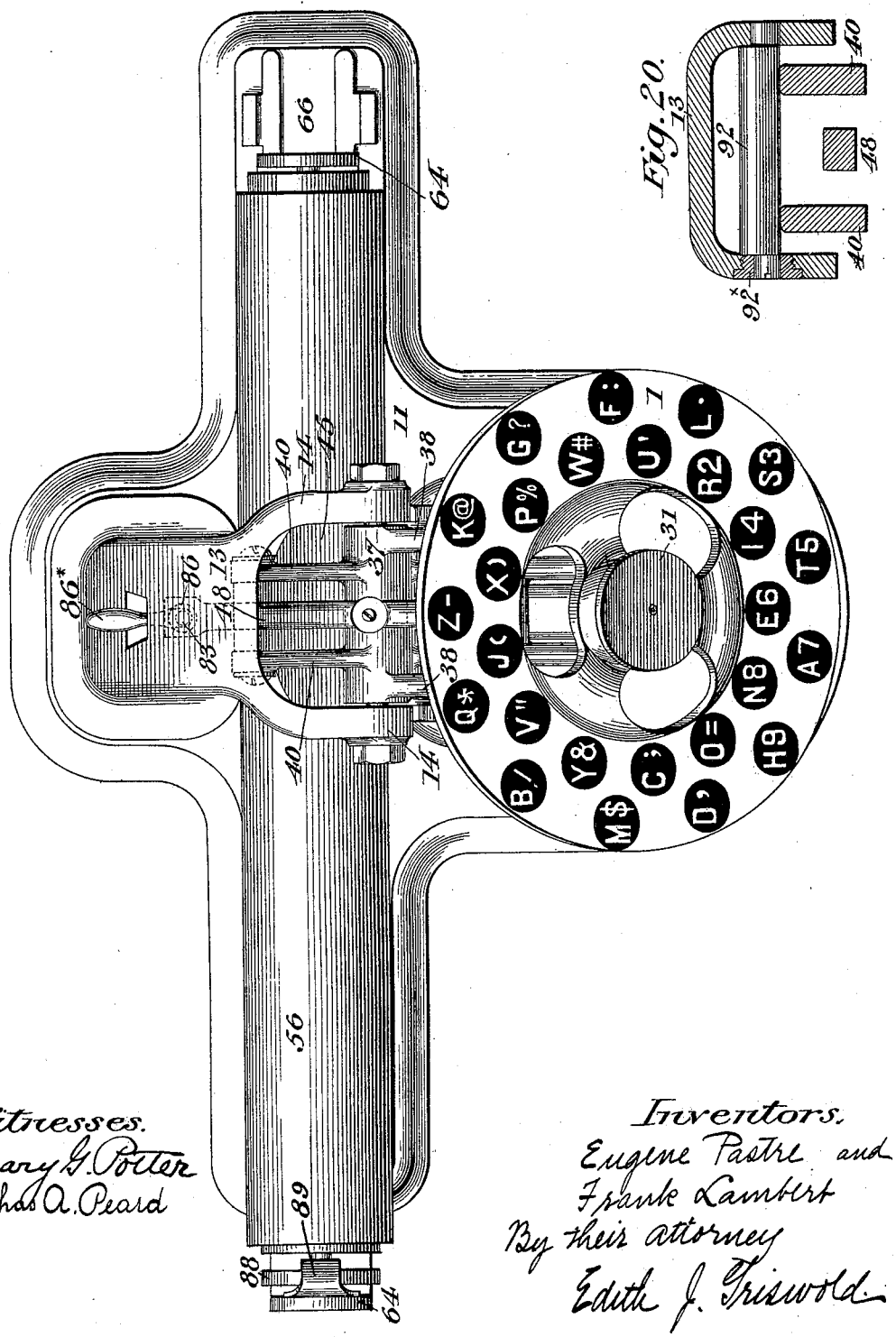

No. 607,270. Patented July 12, 1898.
E. PASTRE & F. LAMBERT.
TYPE WRITING MACHINE.
(Application filed Sept. 24, 1896.)
(No Model.) 8 Sheets—Sheet 3.

WITNESSES:

INVENTORS
Eugene Pastre
Frank Lambert
BY
their ATTORNEY

No. 607,270. Patented July 12, 1898.
E. PASTRE & F. LAMBERT.
TYPE WRITING MACHINE.
(Application filed Sept. 24, 1896.)

(No Model.) 8 Sheets—Sheet 4.

WITNESSES:

INVENTORS
Eugene Pastre
Frank Lambert
BY
Park Benjamin
Their ATTORNEY

No. 607,270. Patented July 12, 1898.
E. PASTRE & F. LAMBERT.
TYPE WRITING MACHINE.
(Application filed Sept. 24, 1896.)
(No Model.) 8 Sheets—Sheet 6.

WITNESSES:

INVENTORS
Eugene Pastre
Frank Lambert
BY
ATTORNEY

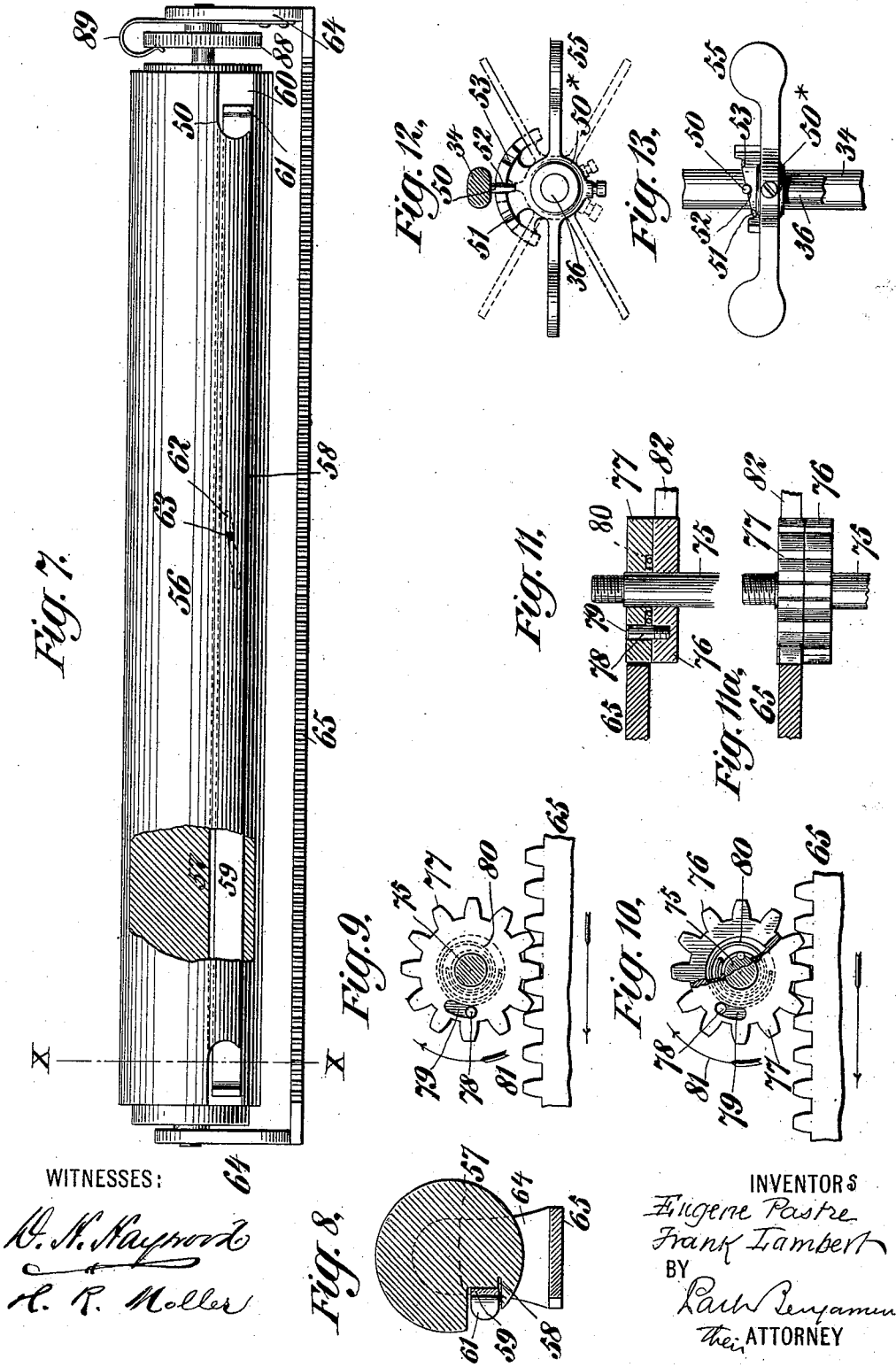

No. 607,270. Patented July 12, 1898.
E. PASTRE & F. LAMBERT.
TYPE WRITING MACHINE.
(Application filed Sept. 24, 1896.)
(No Model.) 8 Sheets—Sheet 8.
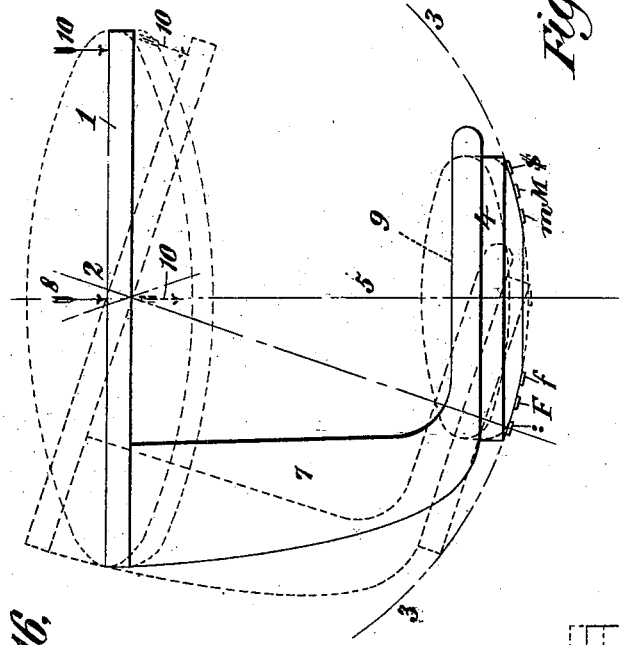
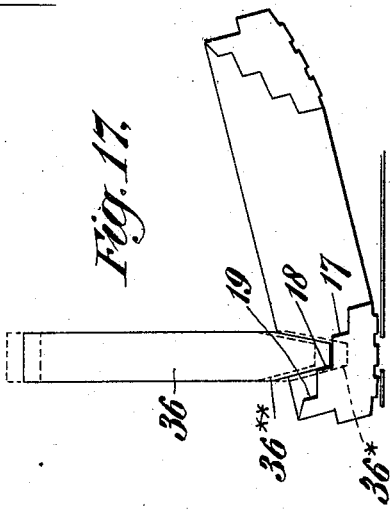
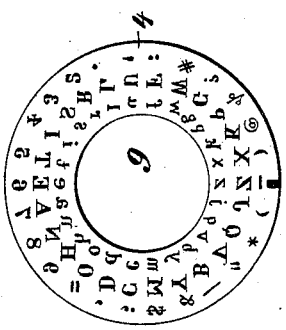
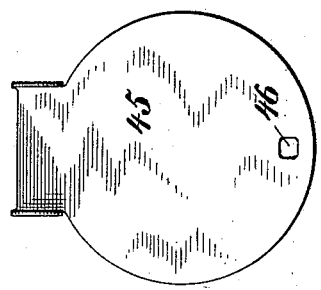
WITNESSES:
INVENTORS
Eugene Pastre
Frank Lambert
BY
Park Benjamin
their ATTORNEY

UNITED STATES PATENT OFFICE.

EUGÈNE PASTRE AND FRANK LAMBERT, OF BROOKLYN, NEW YORK.

TYPE-WRITING MACHINE.

SPECIFICATION forming part of Letters Patent No. 607,270, dated July 12, 1898.

Application filed September 24, 1896. Serial No. 606,833. (No model.)

*To all whom it may concern:*

Be it known that we, EUGÈNE PASTRE and FRANK LAMBERT, of Brooklyn, Kings county, New York, have invented a new and useful Improvement in Type-Writers, of which the following is a specification.

In this type-writer there is a single nutating disk-shaped key upon which all the characters are marked. Rigidly connected beneath this key, and hence always partaking of its motion, is a type-ring the spherical outer periphery of which is struck on a radius from the center of nutation of the key. The center of the type-ring is normally in line with said center of nutation. When the key is tilted, a type on the surface of said type-ring comes into this line and over a platen. Bodily depression of the key brings the type into contact with the printing-surface, and the upper or back movement of the key actuates releasing mechanism, whereby the spring-actuated paper-carriage is permitted or caused to move over a given space before the succeeding type is imprinted.

The essentially novel features involved are the depression of the type-ring with its center in line with the center of nutation of the key, the construction of the type-ring with its inner and outer surfaces struck on a radius from the center of nutation of the key, the construction of the interior of the type-ring with steps and recesses and the arrangement of the adjustable stop-pin in connection therewith, the supporting of the key on a jointed rectangle or Roberval balance in opposition to the constant pull of a spring, so that the pressure on a key at all points is equalized, and the devices for adjustment of the normal distance between the type and platen, together with various novel combinations and instrumentalities more fully hereinafter pointed out, and set forth in the claims.

Figure 2:
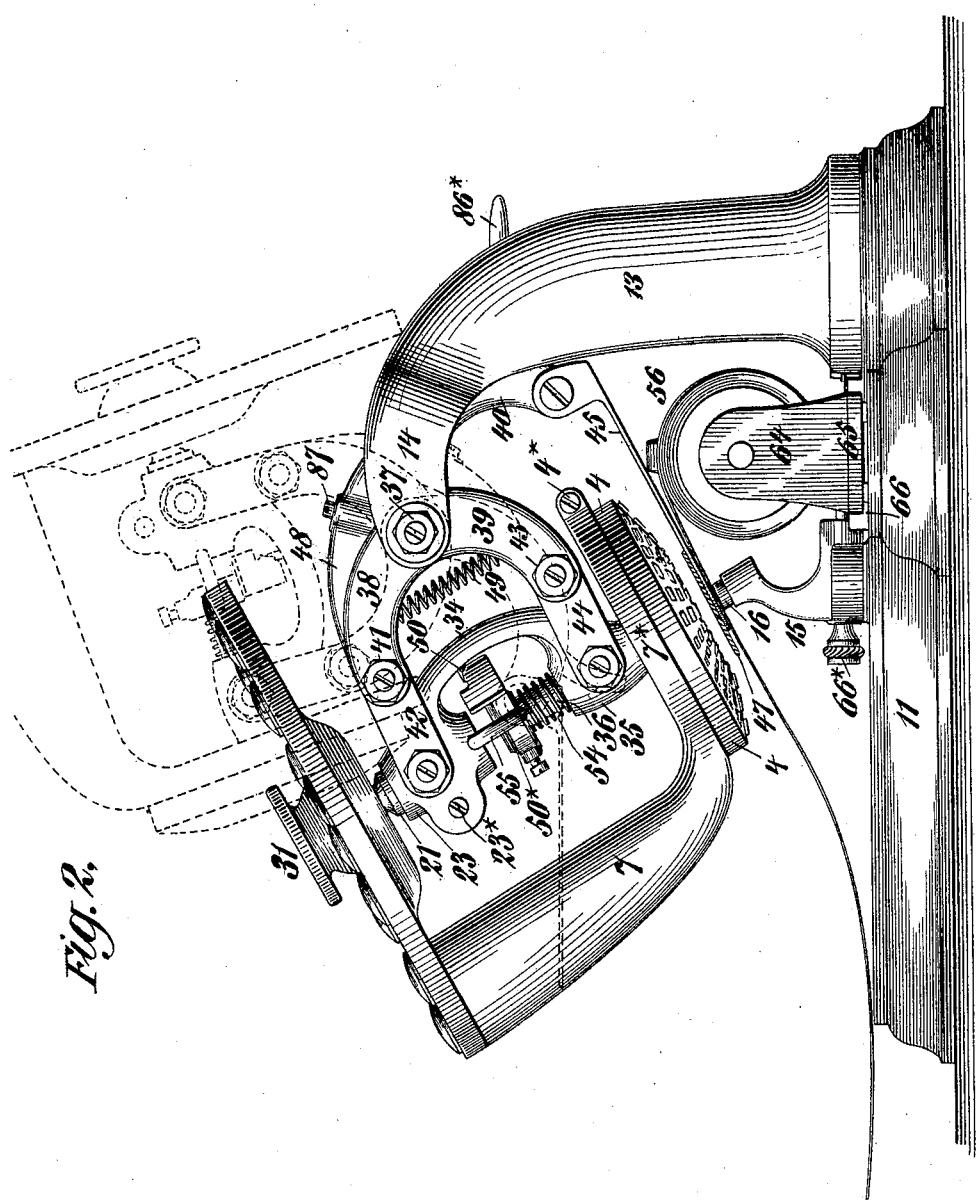
Figure 3:
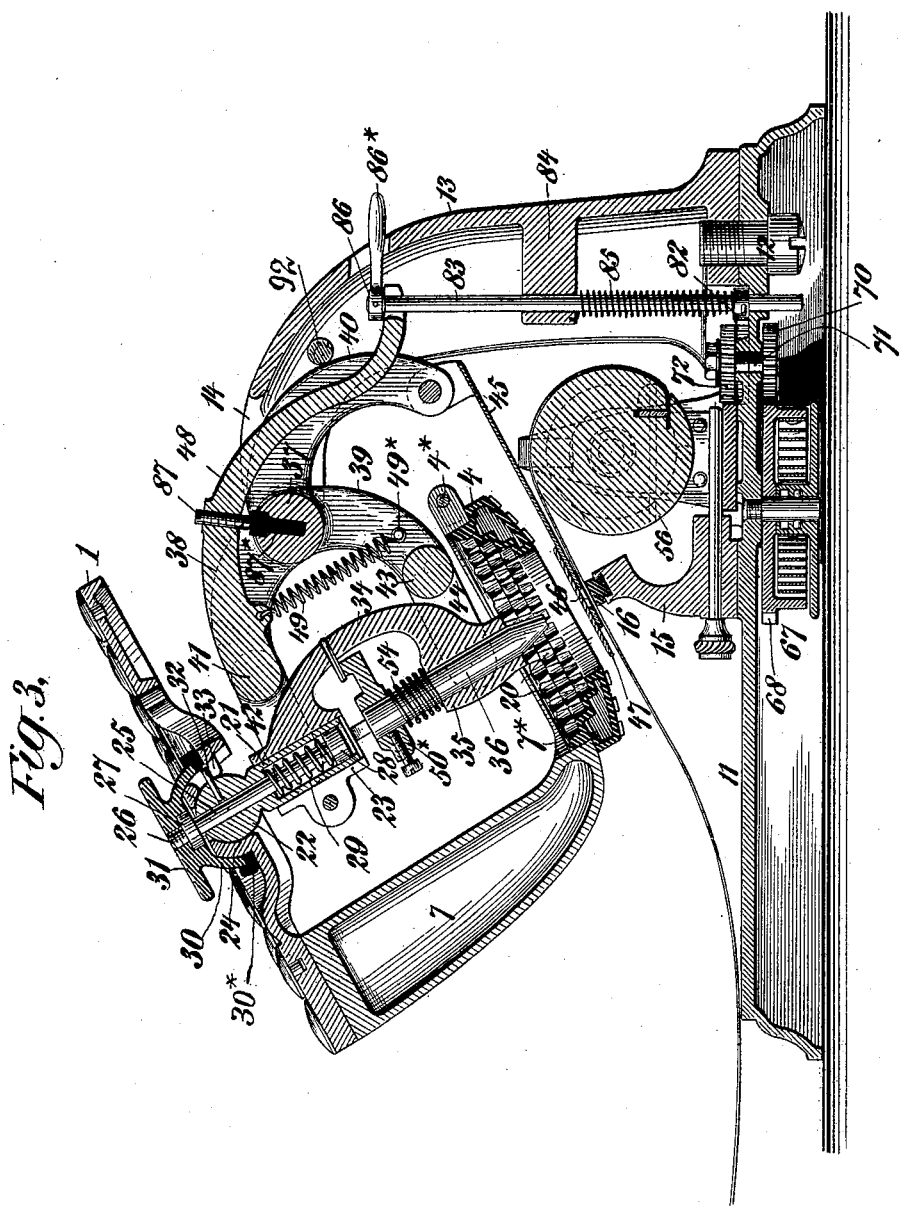
Figure 4:
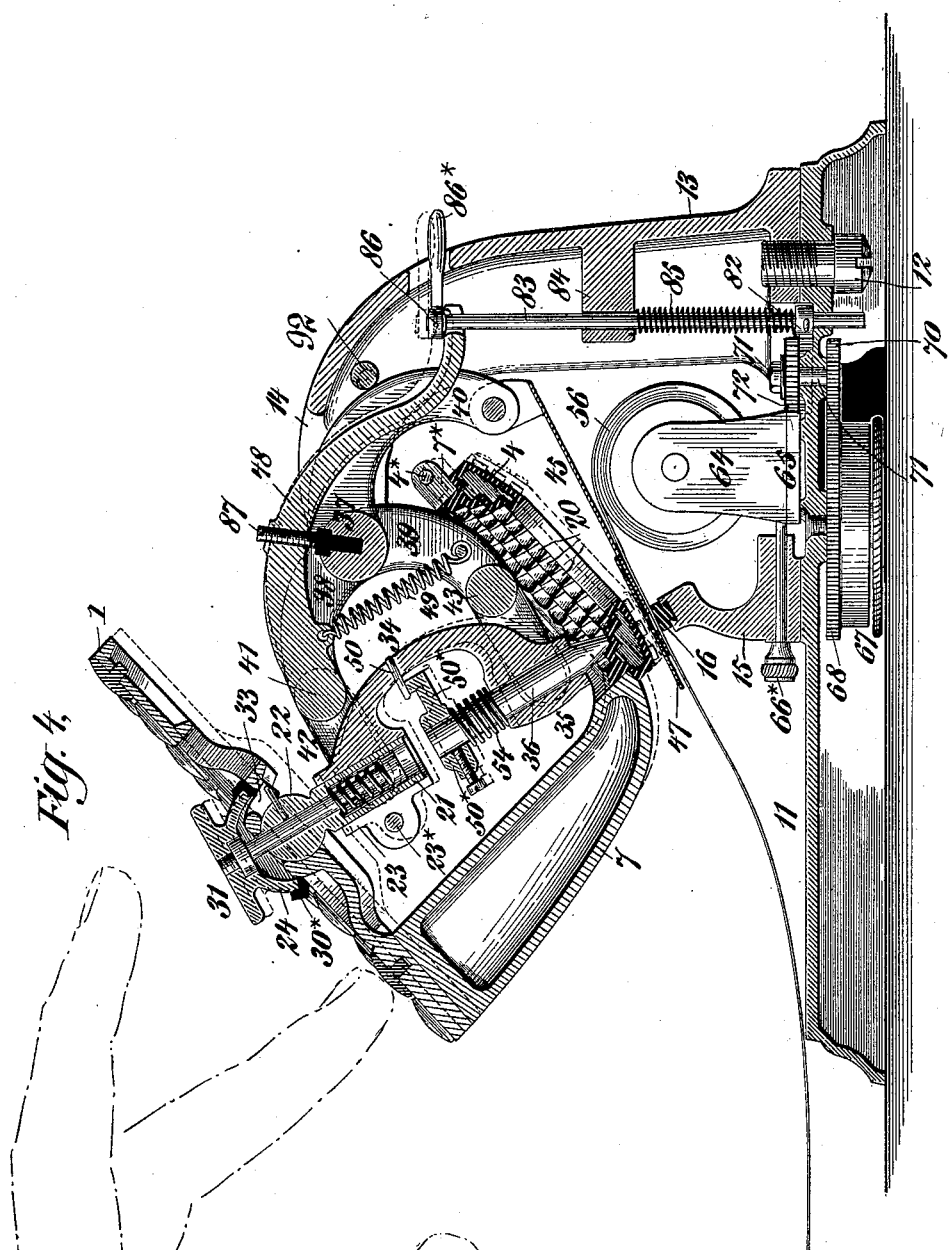
Figure 5:
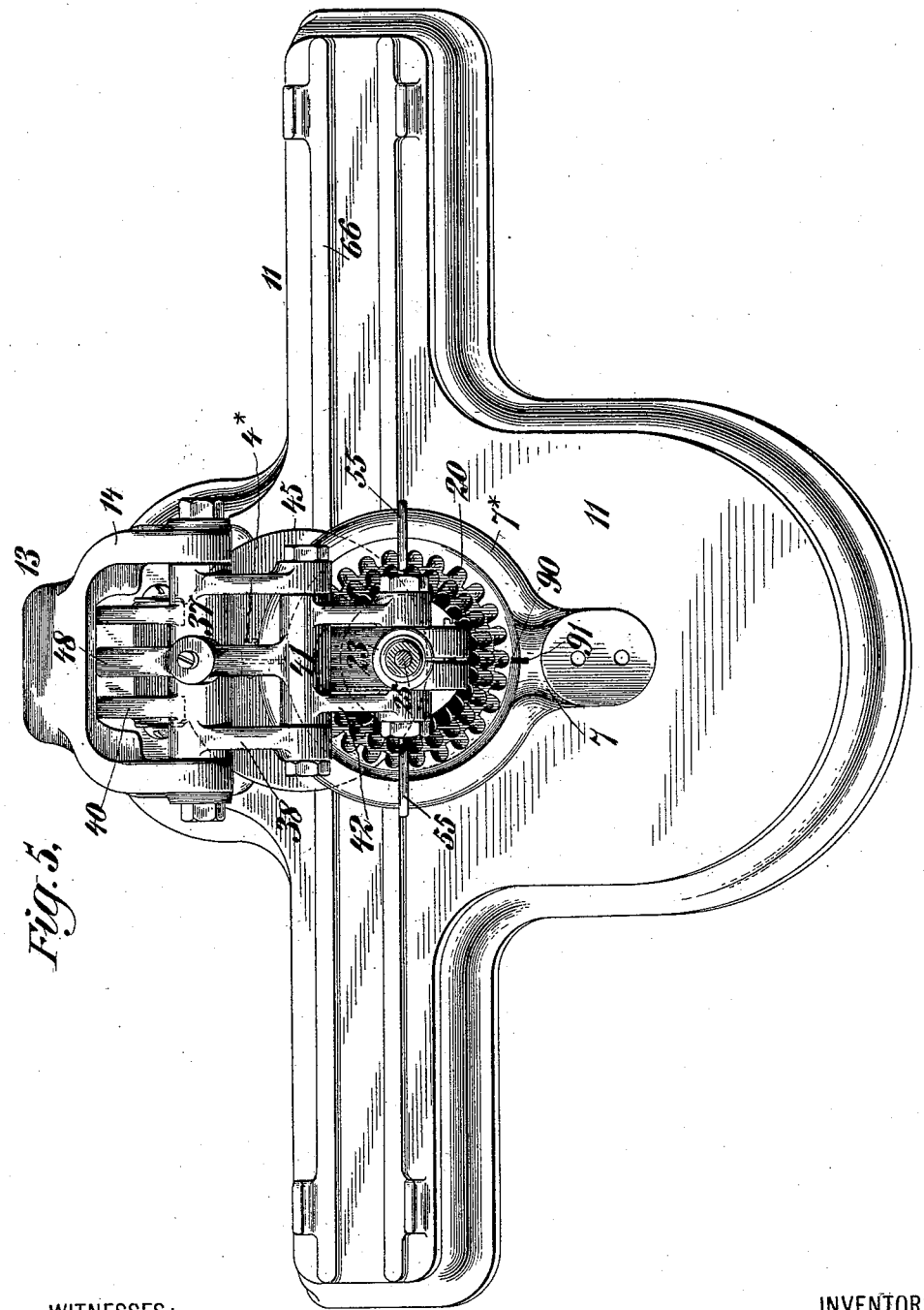
Figure 6:
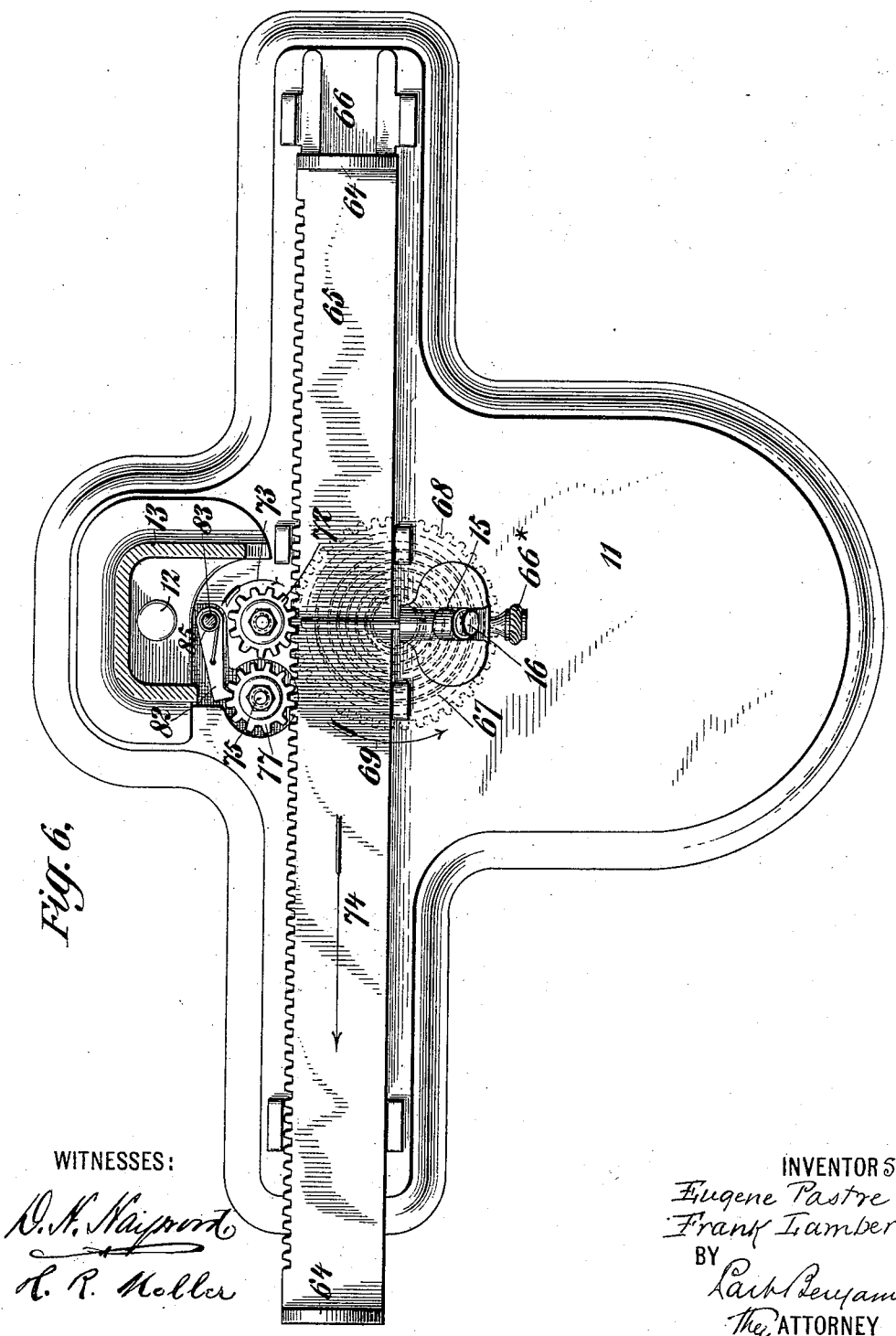

In the accompanying drawings, Figure 1 is a top view of the machine. Fig. 2 is a side elevation showing also in dotted lines the printing mechanism thrown rearward to permit of convenient access to the type, paper, and other parts. Fig. 3 is a vertical section. Fig. 4 is a similar vertical section showing the parts as disposed when the imprint of a character is being made. In Fig. 3 the paper-carriage and actuating-gearing are shown in cross-section, while in Fig. 4 the same parts are shown in end elevation. Fig. 5 is a top view with the nutating multiple key and also the paper-carriage removed. Fig. 6 is a top view of the base of the machine with the printing mechanism and paper-roller removed, but showing the barrel-spring actuating said carriage, the carriage-rack thereon, and the associated gearing. Fig. 7 is a complete front elevation of the paper-carriage. Fig. 8 is a sectional view on the line X X of Fig. 7. Fig. 9 exhibits, in enlarged detail, the carriage-rack and the pinions engaging therewith. Fig. 10 shows the same as Fig. 9, with a portion of the upper pinion broken away to show the lower pinion. Fig. 11 is a vertical section through the pinions shown in Fig. 10, and Fig. 11$^a$ a side view of said pinions, these figures representing the pawl in its two positions. Fig. 12 shows in plan, and Fig. 13 in side elevation, the device for raising and lowering the stop-pin, so as to bring into operation any desired one of the circles of type which are on the type-ring. Fig. 14 is a bottom or face view of the type-ring, showing three concentric circles of type. Fig. 15 is a plan view of the shield or guard, which also supports the ink-ribbon between type and paper. Fig. 16 is a diagram illustrating the placing of the nutating multiple key and the consequent positions of the type-ring. Fig. 17 shows the mode of conforming the recesses within the type-ring and the relation of the tapered stop-pin thereto. Figs. 18 and 19 show in section, respectively, a convex and a concave button, such as may be arranged upon the upper surface of the multiple key. Fig. 20 is a detail view, in transverse longitudinal section, of the cross-bar 92 and associated parts.

Similar numbers of reference indicate like parts.

Referring first to Fig. 16, let 1 be a disk so supported as to be free to nutate upon its center at 2 and not capable of rotation in its own plane on said center. From said center 2 with any convenient radius, as 5, assume a hemisphere to be described, of which 3 3 is a great circle. Let 4 be a ring having a convex outer surface coincident with the surface of the hemisphere and its axis coincident with a radius thereof. On the convex surface of said ring, which for convenience hereinafter we shall term the "type-ring," let there be one or more circles of type, as indicated in Fig. 14. In Fig. 16 it will be seen that where, as in Fig. 14, three circles are employed the types correspondingly located in the said circles also lie in one and the same great circle of the hemisphere. Thus in Fig. 16 there are shown projecting from the surface of the ring 4 the types—for example, "$," "M," "m"—which lie in the great circle 3 3 on one side of the radius 5, and also the characters "f," "F," and ":," which lie in the same great circle, but on the other side of the center line or radius 5. The type-ring 4 is rigidly supported by an arm 7, which extends downwardly from the nutating disk, or, as we shall hereinafter term it for convenience, the "key" 1. Hence if directly at the center of the type-ring a type were situated then the downward movement of the key 1 in the direction of arrow 8 would carry that type against any surface placed beneath it; but the type-ring 4 has a central opening 9, while the type, as already explained, are located on its convex surface. Hence vertical movement of the key in the direction of the arrow 8 along the radius 5 (or, as we shall hereinafter term it, "line of pressure" 5) will not produce any type impression so long as the key 1 is horizontal, as indicated in full lines in Fig. 16—this obviously because no type is situated in said line of pressure 5. It remains, therefore, to bring a desired type into this line of pressure if we desire to print a single character upon a suitably-placed surface, or to bring a series of type successively into said line if we seek to print them in due order to form words and sentences.

Returning now to the nutating motion of the key 1, it will be plain that said key can be inclined on its center 2 in any direction, but never in two directions at the same time. Hence it is easy to assign for each character to be printed a differently-directed inclination of the key. Thus to illustrate in Fig. 1, which shows the upper surface of the key 1, if we press down the key at the point A it will be inclined in a certain direction. If, on the other hand, pressure is applied at the point L, the key will be inclined in a different direction, and so on.

In Fig. 16 the arrow 10 shows the pressure applied at a given point to cause the key 1 to become inclined, as indicated in dotted lines. Now as the key 1 assumes the inclined position it is plain that the type-ring supported by said key will to like extent be inclined, and the effect of this inclination of the type-ring may be to carry a type on its convex surface, as the character "$" in Fig. 16, from a position where it obviously was not in the line of pressure 5 into a position where it is directly in that line. If, therefore, we permanently make the character "$" upon the upper surface of the key 1 in such a plane as that it shall lie in the same great circle 3 as the type "$" on the ring 4, then we have only to tilt the key 1, as indicated by the arrow 10, over an angle sufficient to bring the type "$" into the line of pressure 5, and hence into proper position to be forced against any suitable surface by any suitable pressing device. To effect this pressing action, we prefer to employ a movement of displacement of the center of said key 1 in the direction of the arrow 8.

To recapitulate: The function of the nutating motion of the key 1 is to permit the direction of angle of inclination of the key to be varied. There may be as many determinate angles of inclination as there are different characters to be printed. The key is set at one or another of these angles by pressing its edge downward in the direction of the arrow 10 and in accordance with the character to be imprinted which is inscribed on the key-surface. By reason of this inclination given to the key 1 the type-ring 4 becomes inclined in like direction, and as a consequence the particular type on said ring which lies in the same great circle as the pressure-point (selected) on the key 1 becomes moved into the line of pressure 5. The function of the motion of displacement of the center of the key 1 in the direction of the arrow 8 (and of the line 5) is then to bring the particular type which by the inclination of the disk, as before described, has been carried into the line 5, and hence into proper position to print on the paper or other impression-surface, into contact with the paper. Now, further, these two movements of the disk or key 1 while successive are in continuation and so may be produced by one and the same pressure upon the key. Thus, as will hereinafter be explained in detail, the operator first moves the key to the desired angle of direction by a downward pressure, as indicated by the arrow 10. Then as soon as the key by a suitable stop is prevented from becoming further inclined continuation of that same pressure operates to move the key and type-ring bodily downward in the direction of the line 5, so that a single impulse of the operator's finger delivered upon the appropriate pressure-point on the key-surface both inclines the key to bring the corresponding type carried thereby into position and also moves the key downward so as to cause the type to print.

It will be observed from Fig. 16 that key and type-ring are rigidly connected together, and hence if the key be inclined the type-ring must of necessity be inclined, and if the key be depressed the type-ring must equally be depressed in all cases to a precisely equal extent.

We will now describe the mechanism and its operation in detail.

*The support.*—This consists of preferably a cast-metal base 11, to which is secured by the screw 12 the hollow standard 13, the upper end of which is forked, as shown at 14.

*The platen.*—Extending upward from the base is a standard 15, the upper surface of which may be covered with a block of rubber 16 or other yielding material. This block 16 is the bed or platen over which the paper printed upon passes and which receives the blow of the type.

*The nutating key and type-ring.*—The key 1 is a disk, preferably formed of light material, such as thin metal or hard rubber. The arm 7, also of light material and preferably cast or molded hollow, is secured to the under side of the disk. At the lower end of the arm 7 is a ring 7*, which is slit and provided with a clamping-screw 4*. This ring receives the type-ring 4, which is provided with a shoulder, as shown in Fig. 4. When the screw 4* is loosened, the type-ring 4 may be rotated in the ring 7*, or one type-ring may be removed and another one bearing, for example, different type substituted. A suitable registering-mark 90, Figs. 5 and 14, will be placed on the type-ring 4, and also one, 91, Fig. 5, on the ring 7*, so that by causing these marks to coincide the type on type-ring may be adjusted in definite position to cause its type to register with respect to the characters on key 1.

The type-ring 4 is here shown with three concentric circles of raised type on its convex side. It is to be made light—say of hollow hard rubber, as shown, or part of rubber and part of metal. Its inner surface is correspondingly concave and stepped, there being as many steps as there are circles of type on the outer surface. Thus in the drawings, and especially in Figs. 14 and 17, we show three circles of type upon the ring and three corresponding steps 17 18 19 within it. The peripherical wall of each step is furthermore provided with semiconical recesses, as 20. As each step corresponds to a circle of type on the type-ring so the number and position of the recesses in the peripherical wall of each step correspond to the number and position of the individual type comprising the circle. The reason for this construction will be fully set forth farther on. For the present and for the sake of clearness we will consider the type-ring as having but one circle of type—namely, the middle circle shown in Fig. 14—and hence but one step—namely, 18—corresponding thereto and provided with recesses 20 individually corresponding to said type.

It will be seen from Fig. 3 that the key 1 and upper surface of the type-ring parallel thereto stand at an angle of about thirty degrees to the plane of the base 11. They are preferably to be so proportioned and their weight so distributed and balanced as that they will tend to take a position at right angles to the line of pressure 5 by gravity. The advantage of this is that the strength of the spring 29, which returns the key 1 to normal position after tilting, may then be reduced to a minimum, and as a consequence the resistance offered to the touch of the operator will be correspondingly reduced, and hence the working speed of the machine increased.

*The nutating-key support.*—The arrangement of the key 1 upon a central support, so that it is free to nutate thereon, while prevented from rotating in its own plane, is as follows: 21 is a hollow cylindrical stem surmounted by a ball 22 and held at a fixed angle of inclination in and with the split sleeve 23. In the center of the key 1 is a downwardly-opening socket 24, in which the ball 22 fits. In the upper part of the socket 24 is an opening through which passes the rod 25. This rod extends through the ball 22, above which it has a threaded extremity 26, below which is an annular collar 27. On the lower end of rod 25 is a head 28 within the hollow cylinder 21, and between said head and the shoulder within said cylinder is interposed a spiral spring 29. Finally, surmounting and inclosing the socket 24 is an inverted cup 30, having an upper disk-shaped head or projection 31. The collar 27 is received centrally in this cup, which has a threaded opening in which enters the threaded extremity 26 of the rod 25. The cup is thus truly and rigidly secured upon the end of rod 25. The edge of the cup 30, which bears against the key, is preferably provided with a rubber or other elastic flange 30*, so as to give it an enlarged area of contact with the key-surface.

The operation of the aforesaid parts is clearly shown in Figs. 3 and 4. The effect of the spring 29 is to force the cup 30 against the upper face of key 1, so maintaining the key 1 in proper normal position—that is, in a plane at right angles to the central rod 25. When, however, the key 1 is tilted, as shown in Fig. 4, by the pressure of the finger of the operator eccentrically upon it, then the portion of the disk on the opposite side of the ball from that at which the pressure is applied becomes elevated and in rising carries up with it the cup 30. The rising of the cup is then permitted by the compression of the spiral spring 29, as shown in Fig. 4. When the pressure is relaxed, the expansion of the spring 29 forces the cup 30 downward upon the key 1 and so brings back said key to its normal position. (Represented in Fig. 3.) As the spring 29 is centrally placed, its above-described effect is the same no matter at what point around the circumference of the key 1 the pressure may be applied, and, furthermore, as the tilting of the key is met simply by the compression of the single spiral spring and its return to normal position is automatically effected by the same spring it follows that the impressed movements of the key can be made as rapidly as may be desired.

The cylindrical hollow stem 21 is made elongated, as shown. It is longitudinally adjustable in sleeve 23 and also may be rotated in said sleeve when the sleeve-clamping screw 23* is loosened. By the longitudinal adjustment of the stem the extent of movement of the pressing device or, in other words, the initial distance of the type from the platen may be regulated. By rotating said stem in suitable direction to the right or left the key 1 and type-ring 4, carried thereby, may be placed to adjust the types with respect to the carriage center.

The prevention of rotation of the key 1 in its own plane is effected by the following means: Projecting from the ball 22 is a rigid pin 32, which enters a slot 33 in the disk-socket 24. The slot 33 is sufficiently long to allow the socket to play upon the pin when the key 1 is tilted, as shown in Fig. 4, but its width is only sufficient to allow the pin to enter it freely. Hence any turning tendency of the key 1 is prevented by the sides of the slot 33 bearing upon said pin.

We have already stated that the function performed by inclining the key 1 is the bringing of a type on the type-ring 4 into proper position to be depressed upon the surface to be printed upon, and on referring to Fig. 4 it will be seen that the key having been depressed as there represented the middle type of the three there shown has come directly above the block 16. It is obviously necessary in order to effect this result that the extent of angle of inclination of the key 1 shall be positively limited, so that the operator shall be required simply to press the key down as far as it will go to insure the proper placing of the type in the line of depression 5 of Fig. 16. This brings us to

*The type-ring stop mechanism.*—The sleeve 23 stands at a right angle to the plane of the key 1 when said key is at rest, Fig. 3. Said sleeve is connected by an arm 34 to a second sleeve 35, which stands at a right angle to a plane passing through the upper edge of the type-ring 4 when said ring is at rest. In the sleeve 35 is a pin 36, freely fitted, which has a conical lower extremity. The center of nutation of the key, the pin 36, and the platen are all in the radial line of pressure 5 of Fig. 16, and into this line we have also to bring the particular type on the surface of the type-ring which it is desired to imprint. The end of the pin 36 enters the space 9 within the type-ring. Consequently the peripherical inner wall of said ring will strike said pin when the ring is displaced sufficiently by the tilting of the supporting-key 1. If, therefore, the ring be constructed interiorly, as shown, so that said wall will meet the pin 36 when the angle of inclination is such as to bring the type in proper line over the platen, then obviously the pin will act as a fixed stop to prevent any further inclination either of ring or key. Now the recesses 20 in the inner wall of the ring which strike the pin 36 come into play. Instead of simply a smooth circular wall meeting the pin, in which case there might be some possible vibration or movement of the ring laterally on the pin, so that the ring would not be firmly held in position and the type so maintained in exact alinement in the line of pressure 5 of Fig. 16, the recess 20 in that wall which directly corresponds to the type set in position comes upon and receives the pin. The end of the pin thus enters and closely fits the cavity. In this way possible lateral motion of the type-ring is prevented, and the type is rigidly held in proper adjustment until the key 1 is released and the parts are brought back to normal position. (Shown in Fig. 3.)

We will now describe the mechanism whereby a continuation of the pressing impulse upon the key causes the type thus set to imprint itself upon the paper which, in the manner hereinafter to be described, is supported between type and platen. Pivoted between the fork-arms 14 of the standard 13 is a shaft 37, from which extend three pairs of forks, as follows: Forks 38 extend upwardly and forwardly or to the top and left of Figs. 3 and 4. Forks 39 extend downwardly and forwardly. Forks 40 extend downwardly and rearwardly. These three pairs of forks may be cast integrally with shaft 37. Between forks 38 is pivoted a shaft 41. Integral with this shaft are arms 42, and between these arms 42 the sleeve 23 is pivoted. Between forks 39 is pivoted a shaft 43. Integral with this shaft are arms 44, and between these arms 44 the sleeve 35 is pivoted. Between forks 40 is pivoted a thin metal guard-plate 45. (Shown separately in Fig. 15.) This plate extends over the platen 16 and has a small opening 46, which comes directly below the type which is in printing position. Said plate serves to prevent any possible imprint from type on the type-ring other than from the particular type which is set in place over the opening 46 and the platen. The parts supported by shaft 37 are prevented from falling forward by the cross-bar 92. This bar is inserted in place in the standard 13 by passing it through an opening in one side of the standard closed by the screw-bushing 92*, and its ends are respectively journaled in said standard and in said bushing, as shown in Fig. 20. The middle portion of said bar is eccentric, and said bar may be rotated in its bearings by inserting a screw-driver in its nicked end. Against the eccentric part of said bar the forks 40 rest. By turning said bar on its journals the forks 40, and hence the parts supported by shaft 37, may be bodily elevated or depressed, and thus the angle of the line of pressure 5 to the base plane may be adjusted.

*The printing mechanism.*—Returning now to the following mechanism—viz., the sleeves 23 and 35, connected by arm 34, the forks 38 and 39, the arms 42, pivoted to sleeve 23 and forks 38, and the arms 44, pivoted to sleeve 35 and forks 39—after applying sufficient pressure to tilt key 1 to bring the type-ring into contact with the stop-pin 36 the continued and maintained downward pressure upon the key will move all the parts carried by the arms pivoted in the forks 38 and 39 bodily downward. This is clearly indicated by the dotted lines of Fig. 4, and it is especially important here to observe that the type-ring, and of course the type, is pressed directly down in the direction of the line of pressure 5 upon the paper, which lies upon the platen under the opening 46 in plate 45. Observe, further, that this pressure motion is in a right line and not in the arc of a circle, and this because of the employment of mechanism adapted specifically to causing such motion. Finally, if, as shown in Figs. 3 and 4, a piece of carbon-paper 47, for example, or a carbon-ribbon supported in any convenient way is placed between the type and paper, then an imprint of the type will be produced on the surface of the paper.

Of course it is necessary to provide a means for holding the key 1 and associated parts in normal position against gravity and for restoring them thereto after they have been depressed, for the purpose just above stated. This we accomplish by the following device: Extending rearwardly from the pivot of arms 42 is a curved arm 48. Connected to the under side of this arm 48 and to a cross-bar 49*, extending between the long forks 39, is a spiral spring 49. This spring therefore operates to hold the connected sleeves 23 and 35, and hence the key 1, in highest or normal position and to restore the parts to said position when they are released after having been pushed down.

It is obvious that in order to effect uniform printing it is necessary that the pressure or power required and applied to depress the key and type-ring in the direction of line 5 shall always be uniform and not variable, depending upon the difference of radius at which it is exerted on the face of key 1. While we may adopt various means for accomplishing the result, we herein exhibit one efficient device for the purpose embodied in the mechanism above enumerated—that is to say, (a) the sleeves 23 and 35, rigidly connected, (b) the forks 38 and 39, rigidly connected, (c) the pivoted arms 42, and (d) the pivoted arms 44 obviously form a jointed rectangle. This rectangle is interposed like a balance-arm between the centrally-supported key 1 and the spring 49. Therefore we have the conditions of the well-known Roberval balance, wherein equal weights suspended from the arms or equal pressures applied thereto will always balance each other wherever may be the points of suspension or of application of pressure. Thus while the point of application of the spring 49 on one side of the balance is invariable the point of application of the pressure to the surface of the key is variable; but the effect of difference in leverage due to this variability becomes neutralized by the interposition of the Roberval rectangle, and hence the key may be depressed by uniform pressure regardless of the point on its surface to which said pressure may be applied. The supporting mechanism for the key therefore has two very important additional functions—namely, first, to equalize pressure thereon, and, second, to cause the downward pressing movement of the key to be in a straight line, thus bringing the type squarely and exactly down upon the printing-surface.

*Printing a multiplicity of characters.*— While we have pointed out that in the drawings, and notably Fig. 14, three circles of type are shown on the type-ring, we have so far considered the operation of the mechanism as if there were but one circle. We will now explain the uses of the three type-circles and the arrangement of the mechanism in conformity thereto.

The object of providing multiple type-circles is to increase the number of characters which the machine will print without increasing either the diameter of the type-ring, and consequently the angle of inclination of the key 1 and the number of determined pressure-points on the key. Thus in Fig. 14 the inner circle is of lower-case characters, the middle circle of capitals, and the outer circle of numerals, punctuation-marks, &c. From what has already been explained in order to obtain an impression of any of these characters it is necessary to bring that character into the line of pressure 5. Referring to Fig. 16, it will be plain that as there shown the tilting of the key is sufficient to bring the character "$" into the line 5 and that a similar tilting in suitable directions will bring each of the characters of the outer circle of Fig. 14 into like position; but if we desired to bring a character, as "M," of the middle circle into line obviously a less angle of tilting would be required, while a still smaller angle would be made in adjusting any character, as "m," of the inner circle. What we have to do, therefore, is to make the key adjustable to any one of three different angles of inclination at will, so that when placed at the maximum angle the type of the outer circle will come into the line of pressure 5, and when placed at the minimum angle the type of the inner circle will come into said line, and when placed at the intermediate angle the type of the middle circle will come into that line.

The angle of inclination of the disk is determined, as already explained, by the contact of the inner walls of the type-ring with the stop-pin 36; but inside the type-ring are the three steps 17 18 19. When the stop-pin 36 is placed so as to enter a recess in the wall of the lower step 17, obviously the key 1 is then moved over the minimum angle of inclination, and when placed so as to enter a recess in the wall of the upper step 19 the key is moved over the maximum angle of inclination. This is illustrated in Fig. 17. Here the pin 36, as shown in full lines, meets the wall of the middle step 18. The type-ring, and hence the key 1, is then arrested at its middle angle of inclination, and a character, as "M," of the middle type-circle is brought in line of pressure over the opening 46 in plate 45. If the pin 36 by any suitable means had been lowered, as indicated by the dotted lines at 36* in Fig. 17, then its extremities would have met the wall of step 17, while if it had been raised also, as shown in dotted lines at 36**, then its extremity would have met the wall of step 19. In the first place the ring 4, and hence the key, would have moved to minimum and in the second case to maximum angle of inclination, thus carrying into position, respectively, the characters of the inner and the outer type-circles.

*Adjustment of the stop-pin 36.*—From what has just been explained it is necessary to provide handy means for raising and lowering the stop-pin 36 in order to adjust it into as many different positions as there are type-circles on the type-ring. In the embodiment of our invention here illustrated we accomplish this by the following mechanism: Upon the arm 34, which connects the sleeves 23 and 35, is a fixed projection 50. Upon the upper end of the pin 36 is secured a collar 50*, having an inclined peripherical edge forming a cam, Figs. 12 and 13, in which edge are three recesses 51 52 53, adapted to receive the pin 50. Thus in Figs. 12 and 13 the pin 50 is in recess 52. Between collar 50* and sleeve 35 is a spiral spring 54, which surrounds the pin 36. Secured upon the collar is a lever 55, by means of which said pin 36 may be rotated to bring the cam under the fixed pin 50. Obviously the effect is then to move the pin 36 downwardly, so that if originally it be in the recess 51, and hence in highest position, it will assume lower positions when it enters recesses 52 and 53. Therefore in practice the operator simply turns the lever 55, as shown in dottted lines, Fig. 12, to place the pin 36 in that one of its three positions determined by the cam and recesses aforesaid, which in the manner before described causes the angle of inclination of the key 1 to be suitably limited to bring the characters of the desired type-circle into the line of pressure.

It is important that the pin 36 after adjustment should not be displaced by the type-ring striking against it nor by the subsequent pressure of that ring upon it during printing, such operations having the tendency to push the pin 36 upward. This, however, is opposed and the pin 36 held from upward movement by the cam 50*, which bears against the upper end of the pin in all positions. In the same way any flexion of the type-ring which might be caused by undue pressure on the key 1 at the time of printing is prevented.

As shown in Figs. 2, 3, and 4, the pin 36 is itself adjustable in the cam 50*, whereby the exact extent of tilting of the key in reference to all the rows of recesses is adjusted to a nicety. Looking at the pin 36 as shown in Fig 4, it will be seen that the pin is represented as reaching to or nearly to the bottom of a recess. Should this pin 36 be raised a trifle, the extent of the tilting of the type-ring would be increased, owing to the conicity or bevel of the end of the pin 36. This enables a gradual and fine adjustment of the extent of tilting of the key and type-ring to be made to bring the various type into true printing position for exact alinement.

*Construction of the type-ring and pin.*—The type-ring 4 is preferably of hard rubber and cast hollow by blowing or other suitable process. The type thereon may be integral with the ring or attached thereto, and in the latter case they may be of metal. It will be noticed that the end of pin 36 is conical or tapered and that the recesses 20 in the steps of the type-ring 4 are of corresponding form. If the end of the pin were not tapered in order to enable its periphery to meet the wall of the recess in the type-ring when the ring is tilted, it would be necessary to make said wall undercut. This would prevent the convenient casting of the type-ring in a mold. Therefore the recesses are tapered, as stated, correspondingly to the taper of the pin, and the pin fits snugly in them, obtaining a true half-bearing in every position of the type-ring, and thus preventing any possible lateral motion thereof.

*The paper-roller.*—The paper to be printed on is to be secured to and wound upon the roller 56. In the roller is a longitudinal slot 57, Fig. 8. At right angles to slot 57 is another longitudinal slot 58. Sliding in slot 58 is a metal bar 59. The roller is cut away at one or both ends of slot 58, as shown at 60, Fig. 7, so as to allow access to the turned ends 61 of bar 59. In bar 59 is a short inclined slot 62, dotted lines, Fig. 7, and through this slot passes a fixed pin 63. The edge of the paper is inserted in slot 57, so as to lie between the substance of the roller and one edge of bar 59. Then bar 59 is moved longitudinally. In doing so the inclined slot 62 moves over a simple central fixed pin 63. Therefore the bar 59 is also moved laterally, pinching the paper with equal pressure on both sides of center pin 63 between the edge of the bar and the substance of the roller. To release the paper, the bar 59 is moved longitudinally in the opposite direction.

*The spacing motion.*—The roller 56 is journaled in standards 64, which rise from the plate 65, said plate and standards thus forming the roller-carriage whereby said roller is carried in a longitudinal direction so as to move the paper laterally over the platen-block 16 and beneath the type. The plate 65 slides longitudinally in ways 66, cast or otherwise formed on base 11. It is retained in place in said ways by the pin 66*. Upon one edge of said plate are rack-teeth. Secured within the base 11 is a spring-barrel 67, Figs. 3 and 6, of well-known construction, which when wound up imparts motion to the gear-wheel 68 in the direction of the arrow 69, Fig. 6. The gear-wheel 68 engages with a pinion 70, which is fixed at the lower end of the short shaft 71, which shaft is journaled in the base 11, Fig. 3. Fixed on the upper end of shaft 11 is a pinion 72, and that pinion 72 engages with the rack on carriage-plate 65. Consequently the normal effect of the barrel-spring 67 is to rotate its gear-wheel 68 in the direction of arrow 69, Fig. 6. Then gear-wheel 68 rotates pinions 70 and 72 in the direction of the arrow 73 in Fig. 6, and the pinion 72, acting upon the rack-teeth of plate 65, tends to move that plate in a direction from right to left, as shown by the arrow 74 of Fig. 6. Note, therefore, that there is a constant force acting upon the plate 65 to move it in the direction in which it is to travel in order to allow the type to make successive imprints on the paper carried by the roller. It is therefore necessary to provide mechanism which will permit this motion of the plate to be only of limited extent and to occur once for every type impression or for every unit of spacing interval. Rigidly fixed in base 11 is a pin 75, Figs. 6 and 11, on which pin are loosely mounted the gears 76 and 77. Gear 76 has an upwardly-protruding pin 78, which enters freely the curved slot 79 in gear 77. Said slot is of such length and in such relative position to the teeth of both gears 76 and 77 that when pin 78 rests at either end of said slot the teeth of said gears 76 and 77 are in exact alinement, as shown in Figs. 9 and 10. Seated in a recess in the under side of gear 77 is a light spiral spring 80, Figs. 9, 10, and 11. The effect of this spring is to keep the gears 76 and 77 and their pin and slot in relative position, as represented in Fig. 10. Gear 77 engages with the rack-teeth on plate 65. Engaging with gear 77 is a spring-pawl 82, Fig. 6, which is secured upon the vertical sliding rod 83 in the standard 13. When the rod 83 is raised, it carries the pawl 82 out of engagement with gear 76 and into engagement with gear 77. For the sake of clearness we will first describe the operation of this mechanism, assuming that the sliding rod 83 is raised by hand to bring pawl 82 out of engagement with gear 76 and into engagement with gear 77 and then depressed to bring pawl 82 back into engagement with gear 76. The tendency of gear 72 to force the carriage-plate 65 to the left, as shown in Fig. 6, is met by the engagement with said teeth of the gear 77, which gear is prevented from rotating by the raised pawl 82, Fig. 11ª. Now let pawl 82 be lowered into engagement with gear 76. Then gear 77 will be rotated by the pull of the plate 65 and spring 80 wound up; but the extent of its rotation will obviously be limited by the relative movement of the slot 79 and pin 78 of gear 76, which gear 76, as shown in Figs. 9 and 11, is now held from rotation by the pawl 82. Hence the plate 65 and paper will move only over a limited distance, regulated by the length of the slot 79, sufficient to give proper space between two adjacent imprinted characters. Now assume rod 83 to be raised to bring pawl 82 once more in engagement with gear 77. This gear will then be held, as in the beginning, by the pawl 82; but gear 76 now being freed from the pawl will be caused by the action of the spring 80 to move in the direction of arrow 81 in Fig. 10, and thus will be brought back to its original position.

*Coincident working of printing and spacing mechanism.*—We will now describe how the printing and spacing mechanisms are caused to operate in proper relation, so that the pressure on the key after setting the type in position and causing it to print shall also cause suitable movement of the paper. The rod 83 extends through an arm 84 of the standard. Between this arm and the pawl 82, which is fast on rod 83, there is a spiral spring 85. This spiral spring normally keeps the rod in its lowest position and so maintains engagement between pawl 82 and pinion 76, while it also serves to return the rod to its lowest or normal position after said rod has been lifted and released. On the upper end of rod 83 is a head 86, which lies above the forked rear end of the arm 48. Every time, therefore, that the disk or key 1 is moved downwardly in the line of pressure 5 to cause an imprint of the type the rear end of arm 48 is raised, dotted lines. Fig 4. Hence the action of imprinting the type also elevates arm 48, which lifts rod 83 and pawl 82 out of engagement with gear 76 and into engagement with gear 77, thus permitting gear 76 to move forward, as before described. The arm 48 then returns to its normal position. The rod 83 and pawl 82 are carried down by the action of spring 85. The pawl 82 then disengages from gear 77 and engages with gear 76, so allowing plate 65 (driven by pinion 72) to rotate gear 77 the proper amount required for spacing, as above specified. All of the parts then resume their normal positions.

It will be plain from the foregoing that the spacing motion is effected by the action of the key 1 along line 5 and not by the tilting or nutating motion of the key. Hence in order to cause spacing without printing, as where blanks are left between words and sentences, the operator has only to press upon the flat central plate 31, which surmounts cap 30. This pressure, coming over the center support of the key 1, prevents the tilting thereof and causes only a downward motion, with the result, already stated, of operating the spacing mechanism.

When it is desired to permit the spring-barrel to carry the paper-carriage forward over a comparatively great distance or for any other reason to release the gear 76 or 77 from the pawl 82, that can be effected by slightly rotating the sliding rod 83 by means of the lever 86*. The spiral spring 85, when the lever 86* is released, then operates as a torsion-spring to carry the pawl back into engagement and hold it there.

In the arm 48 is an adjustable screw-stop 87, the end of which bears against a rubber plug 87* in shaft 37. By adjusting this stop the timing of the spacing with the printing motion may be conveniently effected.

*Line-spacing.*—Any known mechanism in common use on type-writers may be applied to the roller to cause it to rotate in its carriage, so as to move the paper onward a given distance to receive a new line of printing. The device herein shown, Fig. 7, is a simple form of hand adjustment consisting of a disk 88 on the roller-journal, having indentations at regular distances apart on its face and a bent fixed spring 89, the extremity of which enters any one of said indentations, so as to hold the roller in place and prevent further rotation.

*The marking of the key.*—The points on the key-surface to which pressure is applied by the fingers of the operator lie, as already explained, in the same great circles 3 3, Fig. 16, as the corresponding type. It is obviously important that means should be provided whereby the fingers may readily and rapidly find these points, and thus be prevented from striking the key at other places on its surface. Thus while pressure at the proper point on the key will bring the type E, for example, into proper position, so that the pin 36 enters and becomes seated in the recess 20, corresponding thereto in type-ring 4, pressure at a point on the key-surface intermediate between E and N, Fig. 1, will cause the partition between their corresponding recesses in the type-ring to meet the pin 36, and hence no type will come into printing position.

In operating the machine at a high rate of speed the danger of striking the key at such intermediate points is augmented. To avoid the above difficulty, we differentiate the pressure-points from the rest of the key-surface. Thus we may render such pressure-points convex or concave. We may make them convexities or concavities in the material of the key or we may secure separate pieces so conformed to the key in any suitable way. Thus in Fig. 18 we show convex buttons and in Fig. 19 concave buttons, which may be seated in the key and, if desired, be of different material. A concavity at the pressure-points brings the finger-tip to the center of the point through the finger sliding therein like a ball in its socket; but we prefer a convexity, since the finger then meets practically but a single point of contact, which is easily felt and recognized.

The characters marked on the key may be inscribed directly on the convexities or concavities or in suitable proximity thereto. It is solely essential that the centers of the pressure-points, concave or convex, be in the great circles, as 3 3, Fig. 16, with the type to which the characters inscribed on or beside such pressure-points correspond.

When an inking-ribbon such as is commonly used in type-writers is employed, we may use any known form of mechanism for causing progression of said ribbon or varying the position thereof.

*Access to the type-ring.*—The entire printing mechanism is supported upon the standard 13 by the shaft 37, so that, as shown in dotted lines, Fig. 2, it may be easily moved rearward in order to expose the under surface of the type-ring to permit of cleansing of the type or any other desired purpose. The guard-plate 45 is hinged to the fork 40, as shown, so that it may be turned downward, also as indicated in dotted lines, Fig. 2, and thus does not interfere with access to the type.

By the term "nutating key" as everywhere herein used we mean a plate bearing characters pivotally supported and capable of a vibrating movement in every direction except in the plane of the plate.

We claim—

1. In a type-writer, the combination of a printing-surface, with a nutating key, a type carried thereby, and a support for said key depressible in a right line; the aforesaid parts being constructed and arranged so that when said key is tilted on said support it carries the type into position over said printing-surface, and when said support is depressed said type is maintained parallel with and pressed against said printing-surface, substantially as described.

2. In a type-writer, the combination of a printing-surface, with a nutating key, a type carried thereby, a support for said key depressible in a right line, and a stop on said support limiting the extent of tilting of said key; the aforesaid parts being constructed and arranged so that when said key is tilted to its limit and meets said stop on said support it carries the type into position parallel to and over the said printing-surface, and upon further pressure of said key said support is depressed so that the type-face is maintained parallel with and brought against said printing-surface, substantially as described.

3. The combination in a type-writer of a nutating key, a series of type controlled thereby and means for equalizing the pressure exerted on said key to bring said type into the printing-line, substantially as described.

4. The combination in a type-writer of a nutating key having a series of pressure-points, type controlled thereby, and means of equalizing the pressure exerted on any of the said pressure-points of said key to bring said type into printing contact, substantially as described.

5. The combination in a type-writer of a nutating key having a series of pressure-points, a support therefor downwardly movable by pressure upon said key, and a spring opposing the movement of said support, the said support being constructed substantially as specified so as to equalize the effects of pressure exerted on any point of the key-surface, substantially as described.

6. The combination in a type-writer of the nutating key 1, type-ring 4 having two or more circles of type on its outer surface, arm 7 connecting said type-ring to said key, and an adjustable stop 36 relatively stationary with respect to the tilting motion of said key and said ring, substantially as described.

7. The combination in a type-writer of the nutating key 1, having socket 24, sleeve 23, cylinder 21 entering said sleeve, ball 22 entering said socket, headed rod 25 passing through said ball and entering said cylinder, head 28, cap 31 and spring 29 acting upon said pin, substantially as described.

8. The combination in a type-writer of a nutating key, a type-ring connected to said key, stop-pin entering said type-ring and means for longitudinally adjusting said pin, substantially as described.

9. The combination in a type-writer of a nutating key, type-ring actuated thereby, stop-pin entering said type-ring and rigid means for preventing said stop-pin from moving upward when said key is tilted, substantially as described.

10. The combination in a type-writer of the nutating key 1, type-ring 4 connected thereto having on its exterior two or more circles of type and on its interior two or more circles of recesses 20 corresponding thereto, and a longitudinally-adjustable stop-pin disposed within said ring and adapted to enter a recess of one or the other of said circles when said key is tilted, substantially as described.

11. The combination in a type-writer of the nutating key 1, type-ring 4 connected thereto, stop-pin 36, sleeve 35, cam-collar 50*, spring 54 between said collar and said sleeve, and pin 50, substantially as described.

12. In a type-writer, a type-ring having types on its outer surface and interior recesses corresponding in position to said types, a stop-pin located within said ring and having its end adapted to enter said recesses, the said stop-pin being beveled at its said entering end, and the recesses being shaped to correspond and to fit upon said stop-pin when said ring is tilted to bring said recesses and said pin into contact, substantially as described.

13. The combination in a type-writer of a nutating key, an arm thereon, a ring carried by said arm and a hollow type-ring supported on said ring, substantially as described.

14. In a type-writer, a centrally-supported key, a type-ring carried thereby and having its upper surface in a plane parallel to the plane of said key, said type-ring being adjustable in its support by rotation, substantially as described.

15. In a type-writer, a key having a plurality of pressure-points, a spring opposing the depression of said key and between said key and said spring a jointed rectangle or Roberval balance, substantially as described.

16. In a type-writer, a nutating key, an arm carried by said key, a type-ring carried by said arm, a movable support for said key, a spring opposing the depression of said support and between said support and said spring a jointed rectangle or Roberval balance, substantially as described.

17. In a type-writer containing a key and rigid central support (as sleeve 23, arm 34 and sleeve 35 unitedly) therefor, arms pivoted at their extremities to two points on said support, a rigid support (as forks 38 and 39) to two points on which the other ends of said arms are pivoted, a pivot-shaft 37 carrying said last-named support, and a spring acting upon said arms and operating to hold said key in definite position against gravity, substantially as described.

18. In a type-writer, a standard as 13, a pivot-shaft 37, rigidly-connected forks on said shaft, arms pivoted at their ends respectively to said forks, a rigid support to which the other ends of said arms are pivoted, a spring acting upon said arms to hold said support in elevated position against gravity, and a key centrally pivoted upon said support, substantially as described.

19. In a type-writer, a standard as 13, pivot-shaft 37, rigidly-connected forks on said shaft, arms pivoted at their ends respectively to said forks, a rigid support to which the other ends of said arms are pivoted, a spring acting upon said arms to hold said support in elevated position against gravity, a key centrally pivoted upon said support, an arm carried by said key, a type-ring carried by said arm, the center of said type-ring and key and said key-support being in line, substantially as described.

20. In a type-writer, a nutating key, an adjustable central support therefor, disposed normally at a right angle to the plane of said key, a type-ring carried by said key, and a stop-pin disposed within and at right angles to the normal plane of said type-ring, substantially as described.

21. In a type-writer, a nutating key, a central support therefor, an arm carried by said key, a type-ring carried by said arm and having two or more rows of type, and an adjustable center stop for said type-ring, the said center stop standing at a right angle to the normal plane of said type-ring, substantially as described.

22. In a type-writer, a nutating key, an adjustable central support therefor, an arm carried by said key, a type-ring supported by said arm, and an adjustable stop within said type-ring, substantially as described.

23. The combination in a type-writer of a multiple key, a type-ring actuated thereby, having one or more rows of type, a stop in the path of said type-ring, means to set said stop in as many definite positions as there are rows of type on the said type-ring, said stop being relatively stationary with respect to the tilting movement of said key and said type-ring, substantially as described.

24. In a type-writer, the combination of a nutating key having a series of pressure-points, and means for equalizing the pressure applied at said points, a paper-carriage having a spring-actuated plate 65 provided with rack-teeth, pin carrying pinions 76 and 77 having pin 78 and slot 79, a spring acting on one of said pinions, pawl 82 and means for raising and lowering said pawl to cause the same to engage with one or the other of said pinions, substantially as described.

25. In a type-writer, the combination of a nutating key having a series of pressure-points, means for equalizing the pressure applied at said points, a depressible support for said key, a paper-carriage having a spring-actuated plate 65 provided with rack-teeth, pin carrying pinions 76 and 77 having pin 78 and slot 79, a spring acting on one of said pinions, pawl 82 and rod 83 actuated by said depressible support, and operating to raise and lower said pawl to engage with one or the other of said pinions, substantially as described.

26. The combination in a type-writer of a nutating key having a series of pressure-points, means for equalizing the pressure applied at said points, an escapement mechanism having spring-actuated toothed gear, a pin, a pinion mounted on said pin, and operated by said gear, a second pinion mounted on the same pin, a pin projecting from the face of one pinion and entering a slot in the opposing face of the other pinion, a spring acting on one of said pinions to rotate it, a pawl, and means for moving said pawl into and out of engagement with either of said pinions, substantially as described.

27. In a type-writer, the combination of a nutating key having a series of pressure-points, a paper-carriage having its motion controlled by said key, and means for equalizing the pressure applied at said points, substantially as described.

28. In a type-writer, the combination of a nutating key having a series of pressure-points, a printing device actuated by said key and means for equalizing the pressure applied at said points, substantially as described.

29. In a type-writer, the combination of a nutating key having a series of pressure-points, a printing device actuated by said key, a paper-carriage having its motion controlled by said key, and means for equalizing the pressure applied at said points, substantially as described.

30. The combination in an escapement mechanism of a toothed gear 65, a spring 67, gear 68 actuated by said spring, a shaft 71 carrying pinions 70 and 72, one of said pinions engaging with gear 65 and the other with gear 68, a pin 75, pinion 77 on said pin and engaging with gear 65, pinion 76 on said shaft, pin 78 on pinion 76 entering slot 79 in pinion 77, spring 80 acting on pinion 77 to rotate it, pawl 82 and means for moving said pawl into and out of engagement with either pinion 76 or 77, substantially as described.

31. In a type-writer having the base 11, fixed standard 13 thereon, the nutating key 1, type-ring 4 carried thereby, and a jointed rectangle supporting said key, substantially as set forth, and a pivot-shaft 37 received in said standard 13 and carrying said rectangle, substantially as described.

32. In a type-writer, the combination of the key 1, having arm 7, and type-ring 4, and a central longitudinally-adjustable support for said key, substantially as described.

33. In a type-writer, the combination of the key 1, having socket 24, ball 22 received in said socket, sleeve 23 and elongated support 21 for said ball adjustable in said sleeve, substantially as described.

34. In a type-writer, a multiple nutating key and a central rotatively-adjustable stop for said key, substantially as described.

35. In a type-writer, a centrally-supported multiple nutating key, and means connecting said key and said support whereby both key and support are caused to rotate together, substantially as described.

36. In a type-writer, a nutating key, a support rotatively adjustable therefor, and means interposed between said key and said support for preventing the rotation of said key in its own plane, substantially as described.

37. In a type-writer, a centrally-supported key, a type-ring carried thereby, said key and said type-ring being both adjustable by rotation, substantially as described.

38. In a type-writer, a nutating key provided with a central socket and a ball received in said socket, one of the said parts having a projecting pin entering a meridional slot in the other, substantially as described.

39. The combination of the key 1 having socket 24 provided with slot 33, and the fixed ball 22 received in said socket and provided with a pin 32 entering said slot 33, substantially as described.

40. The combination of the nutating key 1 having central socket, ball 22 entering said socket and provided with the cylindrical stem 21, rod passing through said ball and provided with heads, and a spring 29 between one of said heads and a shoulder in said cylindrical stem, substantially as described.

41. The combination of the nutating key 1, having central socket, ball 22 entering said socket, and provided with the cylindrical stem 21, rod passing through said ball and having a head within said cylindrical stem, spring 29 interposed between said head and the shoulder in said cylindrical stem and cap 31 carried by said stem, substantially as described.

42. In a type-writer, a tilting type-ring and a central stop relatively stationary with respect to the tilting movement of said type-ring, the said ring being provided with internal cavities or recesses adapted to receive and bear against the bottom face of the end of said stop whereby flexure of said ring is prevented at the time of printing, the said stop being adjustable nearer to or farther from the bottom of said recesses, substantially as described.

43. In a type-writer, a nutating key, a support therefor, a rigid arm depending from said key, and a type-ring supported by said arm below said key, the said type-ring and arm acting by gravity to restore said key to normal position after said key has been tilted, substantially as described.

44. In a type-writer, a nutating key, a support therefor, a rigid arm depending from said key and a type-ring supported by said arm below the key, and a spring, the said type-ring and arm acting by gravity and the said spring directly acting to restore said key to normal position after said key has been tilted, substantially as described.

45. In a type-writer, the combination of a nutating key, type actuated thereby, a printing-surface and a movable shield having an opening through which said type makes contact with said printing-surface, the said key, type and shield being jointly movable away from said printing-surface in order to expose the same to view, substantially as described.

46. In a type-writer, the combination of a paper-carriage, a roller supported thereon, said roller having a longitudinal groove, a bar within said groove having an inclined slot, and a fixed pin within said slot, whereby said bar when moved longitudinally travels over a diagonal path to clamp said paper upon said roller, with the edge of said paper parallel to the axis of said roller, substantially as described.

47. A multiple key capable of being bodily depressed and means to equalize the extent of motion at any portion of said key while it is depressed, substantially as described.

48. In a type-writer, a multiple key, type controlled thereby, and a printing-platen, the distance between said type and said platen being variable, and means to keep the face of said type and face of said platen parallel while their relative distance is reduced (and said type brought to print), substantially as described.

49. A multiple key, a support for said key, both said key and said support being depressible, the axis of said support as it moves downward always maintaining a position parallel to its normal position.

50. The combination of a multiple key, a movable support for said key, and means to vary the direction of line of motion of said support, substantially as described.

51. The combination in a type-writer of a multiple key, type actuated thereby, a movable support for said key and means to vary the direction of line of motion of said support, substantially as described.

52. A multiple key, a movable support for said key and means to equalize the pressure at any point of the key from its center thereof to move said support.

53. A type-ring having on its exterior two or more rows of type, and a concave interior with a corresponding number of rows of recesses, said recesses being formed in the shape of a semicone, all said conical recesses being of the same angle and size, substantially as described.

54. In a type-writer, a type-ring having a series of type on its exterior, and on its interior a corresponding series of recesses, said recesses being each formed in the shape of a semicone, substantially as described.

55. In a type-writer, a nutating key, a type-ring actuated thereby, and means to rotate said type-ring on its own axis to adjust it in proper relation with said key, and means to lock said ring in position when adjusted, substantially as described.

56. A multiple key, a support therefor, a resetting-cap resting on the face of said key, a sliding rod secured to said cap, said rod extending above and below the contact-face of said key and said resetting-cap, substantially as described.

57. The combination of a multiple key, a support therefor, and a resetting spring-actuated cap for said key, said spring contained in said support below said cap, substantially as described.

58. The combination of a multiple key, a support therefor, with a resetting-cap for said key, a rod secured to the said cap, said rod being guided and free to slide in said support.

59. In a type-writer, a multiple key and a central longitudinally-adjustable support for said key.

60. A multiple tilting key and means to vary and gradually adjust the extent of tilting of said key, substantially as described.

61. A multiple key pivotally supported, a stop in the path of said key below said pivot and means to vary and predetermine the extent of tilting of said key, substantially as described.

62. A multiple key capable of being tilted in various directions, a relatively stationary adjustable stop for said key independent of its tilting motion and means to vary and predetermine the extent of tilting of said key, substantially as described.

63. In a type-writer, a multiple tilting key, type actuated thereby and means to vary and gradually adjust the extent of tilting of said key and to stop said type in true printing position, substantially as described.

64. In a type-writer, a multiple tilting key, two type controlled thereby, a stop in the path of said type and means to vary and gradually adjust the stopping-point of said type to bring them in true printing position.

65. In a type-writer, a multiple key, type-ring actuated thereby and provided with an internal row of recesses, beveled stop in the path of said ring and fitting said recesses, said stop being adjustable nearer to or farther from the bottom of said recesses, substantially as described.

EUGÈNE PASTRE.
FRANK LAMBERT.

Witnesses:
JOHN F. SOCEEIS,
H. R. MOLLER.